FIG. 1

INVENTORS
FRANK R. HYNES
EDWARD J. LAVANDER

Nov. 5, 1968  F. R. HYNES ET AL  3,409,361
MICROFICHE POSITIONING APPARATUS

Filed May 17, 1966  7 Sheets-Sheet 3

FIG. 3

INVENTORS
FRANK R. HYNES
EDWARD J. LAVANDER
BY
Leonard J. Shechter
[signature]
ATTORNEYS

INVENTORS
FRANK R. HYNES
EDWARD J. LAVANDER
BY Leonard J. Shechter
Norman P. Schnider
ATTORNEYS Nov. 5, 1968  F. R. HYNES ET AL  3,409,361
MICROFICHE POSITIONING APPARATUS
Filed May 17, 1966  7 Sheets-Sheet 6

INVENTORS
FRANK R. HYNES
BY EDWARD J. LAVANDER
ATTORNEYS

United States Patent Office 3,409,361
Patented Nov. 5, 1968

3,409,361
MICROFICHE POSITIONING APPARATUS
Frank R. Hynes and Edward J. Lavander, Rochester, N.Y., assignors to Xerox Corporation, Rochester, N.Y., a corporation of New York
Filed May 17, 1966, Ser. No. 550,849
3 Claims. (Cl. 355—42)

This invention relates to apparatus for supporting and positioning microfiche in optical scanning apparatus to facilitate the making of enlarged reproductions from microimages arranged in the microfiche.

This invention relates to microform projection apparatus that scans microimages arranged on a microfiche and projects a light image of the microform onto a revolving xerographic drum. The supporting mechanism or holder must be capable of selectively positioning the microfiche so that the proper image, or images, may be projected onto the xerographic drum.

The present invention allows a microfiche to be viewed in a projection apparatus and scanning mechanism such as the one disclosed in U.S. Patent No. 3,160,058, issued Dec. 8, 1964, to John Rutkus, Jr. This project apparatus and scanning mechanism is suitable for use in a xerographic machine of the type disclosed in U.S. Patent No. 3,078,770, issued Feb. 26, 1963, to Hunt et al. A similar attachment used to hold aperture cards having microfilm mounted therein is shown in U.S. Patent No. 3,205,769 issued to Roth et al. issued Sept. 14, 1965.

As is well known, in recent years the steadily increasing size of various industries and, especially the scientific information available to the government, has required an enormous increase in the number and variety of technical records and reports that must be made, maintained, disseminated and be kept available for use. Prior to the advent of the unitized microform known as microfiche, conventional systems utilizing aperture cards or microfilm rolls and various types of viewing or print-out devices were employed for this purpose. However, the increasing enormity of record making and print-out operations made this phase of information storage, retrieval and dissemination increasingly expensive and burdensome to the point that it was becoming economically unfeasible to continue by conventional techniques.

Generally in the microfilm data processing system, records are maintained under conditions of relative security from destruction and, at the same time, are available for day-to-day use. This system, generally known as a "unitized" microfilm system, comprises the basic steps of copying onto microfilm, original drawings, documents, memoranda, reports or other records likely to require reproduction at a later date, etc.; maintaining a continuous film reel of the microfilm or mounting the individual microfilm frames into the apertures of microfilm data processing cards, which may be designated by coded perforations for use in conventional card-controlled machines; and using such film reels or microfilm cards for the reproduction of the image thereon. However, the use of aperture cards involves considerable costs for mounting the microfilm frames on processing cards for handling and filing more than one card for each original in the event that a multi-document report is to be printed out on a print-out apparatus.

In the field of microfilming, a microfiche is a single sheet of film containing sequences of microimages and is provided with a heading area for titles, authors, names, classification data, etc., which can be read by the unaided eye. A microfiche is an ideal form for containing related images and is unsurpassed when compared to other systems of microfilming for economy, storage, ease of handling and print-out for images that represent many pages of a single report or books that are to be occasionally or extensively reproduced for wide distribution.

A microfiche may contain anywhere from 20 to 112 microimages, depending upon the size of the form film sheet. For recording and storing images of periodicals, books or reports having 20 to 112 pages, a single microfiche will accomplish the purpose as opposed to the need for the same number of aperture cards as there are pages. The storage of a single film sheet requires far less space than a bundle of aperture cards and the handling of a single film sheet for processing and print-out involves far less manipulation steps than that necessary for processing and the print-out of aperture cards. This ease of handling of all phases in microfilms used is further compounded when microimages are to be used as masters to produce other microimages. One fiche in wide spread use is the 4 inch by 6 inch size. This fiche contains 60 microimages on the first or cover microfiche and 73 on each trailerfiche. The trailerfiche accepts 12 additional images in place of the title space on each first microfiche.

The widely accepted use of microfiche as a means of storing data has not only increased the use thereof, but has thus resulted in the necessity of being able to selectively reproduce images on a given microfiche without reproducing the entire card or being able to reproduce the entire microfiche with a minimum amount of manipulation of the microfiche.

Iti s therefore the primary object of this invention to improve the selection, projection and optical scanning apparatus for use with the microfiche.

It is a further object of this invention to improve microfilm scanning apparatus, for use in xerographic reproducing apparatus to permit scanning of selected images from a microfiche.

Another object of this invention is to improve scanning and projection apparatus used in automatic xerographic reproducing machines so that a holder containing a microfiche with microform images therein may be manually positioned within the projection apparatus to selectively scan one or several images and to reset the holder so that additional images may be reproduced without repositioning the microfiche.

These and other objects of this invention are attained by means of a movable carriage mounted in a projector including horizontal and vertical microfiche indexing. The microfiche holder is capable of being selectively indexed vertically and horizontally in the carriage and the carriage is movable relative to the projector lens, thereby enabling the desired, predetermined location on the microfiche to be scanned by the projector lens.

For a better understanding of the invention as well as other objects and further features thereof, reference is had to the following detailed description of the invention to be read in connection with the accompanying drawings, wherein.

Figure 1:
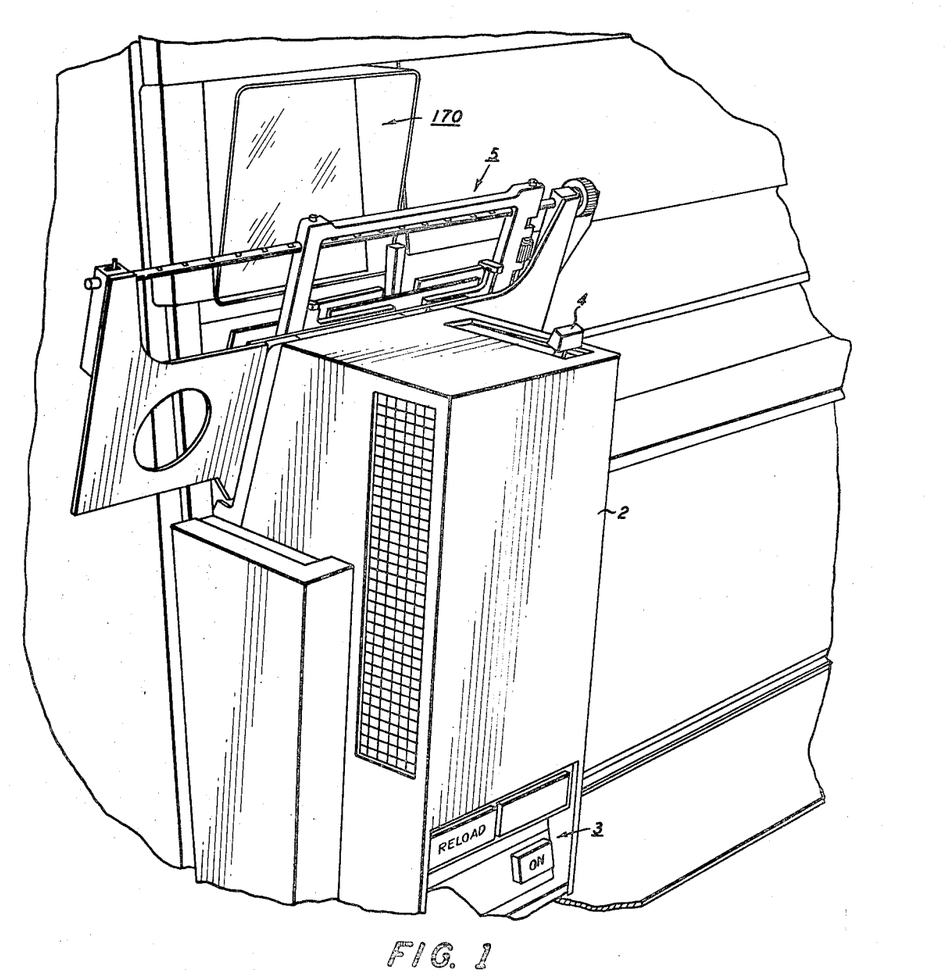
FIG. 1 is a perspective view of an optical projector containing the present invention.

As seen in FIG. 1, a xerographic copier of the type disclosed in the above-identified U.S. Patent No. 3,078,770 generally designated 1 and containing an exposure mechanism 2 is used to illustrate the invention disclosed herein.

The exposure mechanism of the xerographic copier of this invention is adapted to scan the object to be reproduced and to project an enlarged flowing image of the object onto the rotating xerographic drum in synchronization with the rotation of the xerographic drum. In this type of projection apparatus, the scanning of the object is accomplished by means of a movable carriage, generally designated 5, supporting the objects to be reproduced and moved relative to an optical system in synchronization with the rotation of the xerographic drum. Control panel 3 controls the operation of the xerographic apparatus and the exposure mechanism. Specifically, referring to FIGS. 1, 2, 3, 4, 5, and 6 the optical scanning mechanism or projector 2 includes a main projector casing 7, which can be formed as an integral part of the main frame of the xerographic apparatus or formed as a separate element secured to the frame of the xerographic apparatus a lamp assembly 8, a condenser lens assembly 9, and a projector lens assembly 10 all in alignment with each other and with the carriage assembly 5 carrying the microfiche to be scanned.

In the description of the projector, when reference is made to the front of the projector, it is to be understood that this means the output end or lens end of the projector, without reference to its location on the xerographic apparatus.

The lamp assembly 8 includes a projector lamp LMP-1 positioned in a conventional lamp socket and bracket assembly 11. Both the lamp and the lamp socket assembly are partially enclosed by a lamp housing 12, having secured thereto a conventional reflector 13 and a heat filter 14.

The lamp assembly is secured to the top of the main projector casing with the lamp housing positioned over an opening therein which serves as a conduit connecting the outlet 15 of a motor driven blower unit 16 used to dissipate heat generated by the lamp LMP-1. When the projection lamp is energized, light from this lamp passes through the lens 17 of the condenser lens assembly 9 to illuminate the copy to be reproduced. The condenser lenses are suitably spaced and aligned within a condenser lens housing 18 and secured therein by lock ring 19.

The microfiche to be scanned is supported in carriage assembly 5 for movement in a plane perpendicular to the axis of the condenser lens. The mirofiche is scanned to project a flowing image of the object through the projection lens assembly 10.

The carriage is driven in one direction to scan the object to be copied by means of a scan bar 20 adapted to be forced into frictional contact with a continuously rotating roller 21. The scan bar 20 is secured to a holder 22 which is pivotally secured to the carriage by means of a scan bar. Stud 23, passes through a bearing bar 24, the holder 22, and extends beyond the edge of the holder 22 to receive a retaining ring 26. The bearing bar 24 is mounted on a carriage shaft 35 which supports and guides the carriage assembly during the scanning movement.

The carriage 105 is fastened to the bearing bar 24 by means of screws 106. The upper end of the carriage 5 is guided in a path perpendicular to the axis of the condenser lens by means of a carriage guide 27 secured to the back side of the carriage assembly 5 between a pair of bearings 28. To support the bearings 28, there is provided a top plate 29 secured to the condenser lens housing 18. The top plate 29 contains a bearing plate 30 secured thereon. The bearings 28 are held in place by bearing retaining screws 31, threaded into the top plate 29.

To effect return of the carriage to its original starting position, there is provided a return spring 32 encircling the spring support rod 33, secured in the side walls of the projector casing. The return spring 32 is retained at one end by the wall of the projector casing and at its other end contacts spring plate 34, secured to the carriage plate, suitable apertures being formed in the spring plate for the passage of spring support rod 33 and carriage shaft 35.

Figure 6:
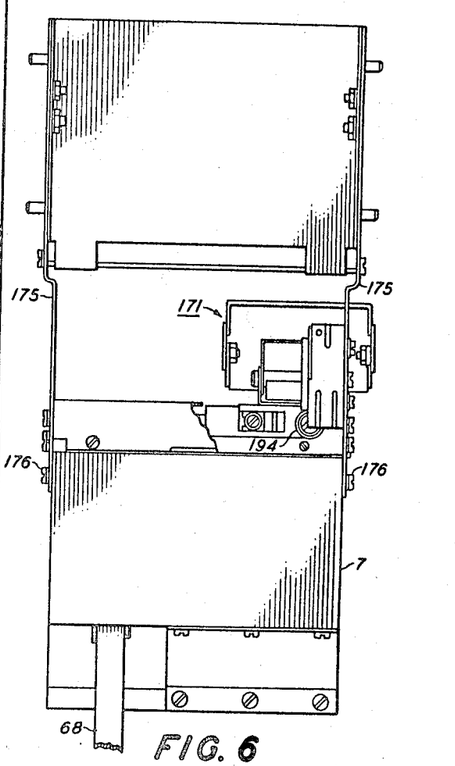
FIG. 6 is a rear view of the optical viewer shown in FIG. 4.
Figure 7:
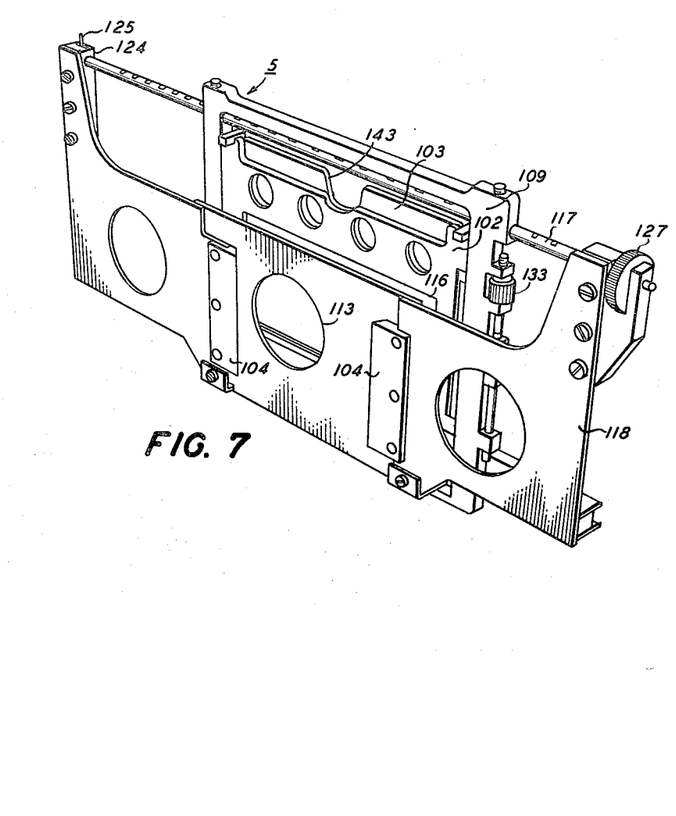
FIG. 7 is a front perspective view of the microfiche holder.
Figures 8, 10:
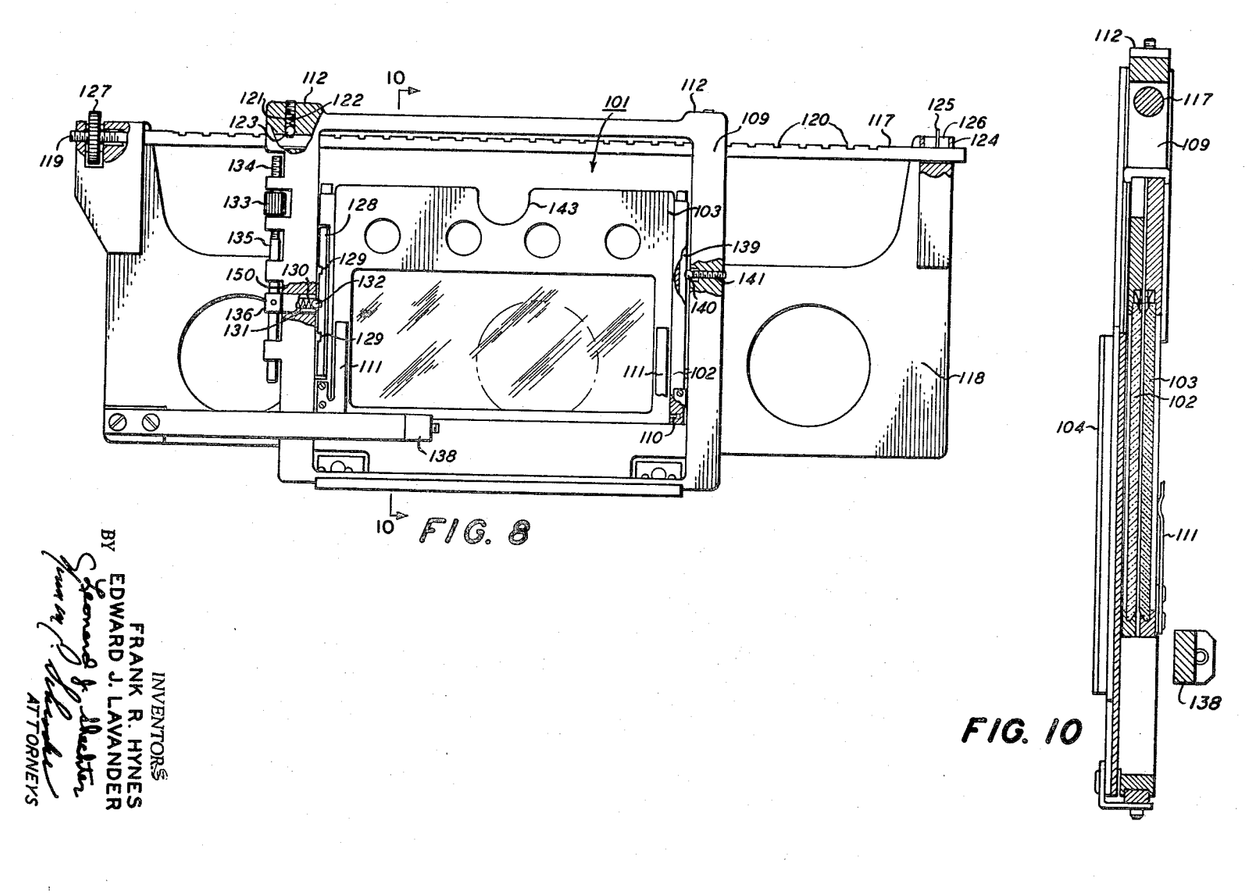
FIG. 8 is a rear view of the microfiche holder with parts broken away for clarity.
FIG. 10 is a sectional view of the microfiche holder taken along line 10 of FIG. 8.
Figure 9:
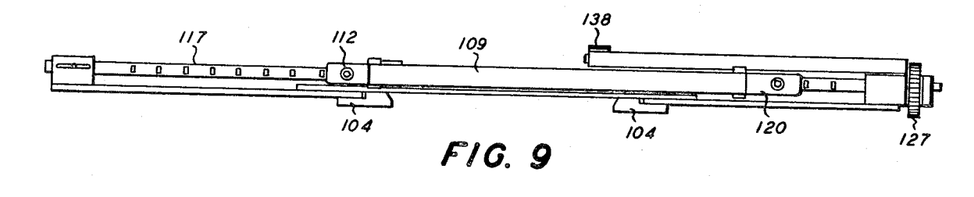
FIG. 9 is a top view of the microfiche holder.

To regulate the length of travel of the carriage with respect to the size or number of images to be reproduced from the microfiche, there is movably positioned on guides 36 and 37 secured to the side walls of the main projector casing, a cam plate 38, having mounted on its left-hand side (right-hand side as seen in FIG. 6), a carriage return stop cam 39 and on its right-hand side (left-hand side seen in FIG. 6), a scan limit plate 40, which are used to define the start-of-scan position and an end-of-scan position, respectively, of the carriage. The length of travel of the carriage is best controlled by varying the starting and stopping position by means of the return stop cam 39 and the scan limit plate 40. The carriage movement is controlled with respect to these elements by means of a cam follower 41, secured to the carriage plate in position to ride against the cam 39.

The length of scan of the carriage is regulated by the manually manipulated selector lever 4, used to rotate a pinion 42 which engages a rack 43 secured to the cam plate 38. Pinion 42 is secured to one end of a shaft 44 suitably journaled in the projector casing. The other end of the shaft carries a gear 45, which meshes with gear 46, secured to the shaft 47 on which the selector lever 4 is secured. The shaft 47 is suitably journaled in a selector gear housing 48.

A bracket 49 having a scale 50 thereon indicating the proper position of the selector lever for scanning a particular size image or group of images on the microfilm is secured to the top of the projector casing, and is mounted on the outside of the projector covers. In the embodiment disclosed, the projector is adapted to scan four positions labeled A, B, C and D. The adjustment varies the length of the scan. The A and B position would accommodate "A" size paper for scanning one frame or image, the C position on "B" size paper for scanning 2 frames or images and the D position for scanning 6 images on a "C" size paper. The selector lever is maintained in any preselected position by means of a ball 51 engaging suitably positioned depressions in detent block 52, secured to the selector gear housing. The ball 51 is biased toward the detent block by a spring (not shown) retained in the selector lever. Travel of the selector is limited by means of lever stops 53 positioned at opposite ends of the detent block.

Roller 21, which drives the carriage by frictional contact with the scan bar 20, is secured to shaft 54, which carries one gear 55 meshing with worm 56 carried by drive shaft 57. Shaft 54 is journaled by bearings 58 positioned in cover 60 of gear housing 59, and in the outer wall of gear housing 59. The bearings 58 are retained by a threaded lock ring 61. Axial alignment of shaft 54 is maintained by nut 62, disposed against bearing retaining washer 63 at the threaded end of the shaft, and by bearing spacer 64 and retaining ring 65 mounted in a suitable groove at the opposite end of the shaft.

Drive shaft 57, journaled by a pair of bearings 66 mounted in the gear housing (FIG. 5) carries a pulley and hub assembly 67 driven by a belt 68, at a predetermined speed relative to the xerographic drum in the xerographic apparatus.

As shown in FIG. 6, worm 56 butts at one end against a shoulder of shaft 57 and at its other end against a spacer 69 interposed between the worm and a bearing 66 at the threaded end of the shaft. The axial alignment of the shaft 57 is maintained by bearing retaining washer 70 forced into contact with the interface of the bearing by nut 71. Removable bearing caps 72 are secured to the gear housing to seal the nut ends of shaft 57 and 54. To eliminate dust from entering the gear housing, the drive end of shaft 57 is sealed by means of a shaft seal 73 enclosed by a seal retainer 74 suitably secured to the gear housing.

To force the scan bar 20 of the carriage into frictional contact with roller 21 to effect a scan movement of the carriage there is provided a pressure roller 75, here shown as a bearing, mounted on a bearing pin 76 in a bifurcated pressure lever 77. A solenoid operated lever 78 is also held on pin 76 by retaining rings 79 positioned in suitable grooves at the opposite ends of the bearing pin.

The lever 78 is pivotally secured at one end to the gear housing by a pivot stud 80 which passes through the lever 78, pressure lever 77 and the gear housing 59. The pivot stud 80 is retained therein by means of a retaining ring (not shown) at one end of the pivot stud and by means of a washer 81 and a nut 82, the latter being threaded onto the end of the pivot stud.

The lever 78 is connected at its opposite end by a connective pin 83 to the plunger 84 of the solenoid SOL-1 attached to the gear housing, whereby as the solenoid is energized the lever is pivoted about the axis of the pivot stud 80 thereby rotating the pressure roll against the scan bar 20 to force it into frictional driving contact with the roller 21. The lever 78 has an aperture formed therein to permit it to be moved relative to the roller 21 over which it is positioned.

As the carriage is advanced by the frictional drive between the scan bar 20 and the roller 21, the limit switch 1LS attached to the carriage contacts the end-of-scan limit plate 40, whereby the limit switch is actuated to break the circuit to the solenoid SOL-1. As the solenoid is de-energized, the contact force supplied to the scan bar is released to permit the carriage to be returned by spring 32 to the start-of-scan position.

To protect the elements of the projector mounted within the casing from dust and other foreign objects, the bottom of the projector casing is closed by means of a base plate 86, a front dust cover 87 and a rear dust cover 88.

The projector lens assembly 10 has a focusing arm 60 actuated by a lever 61 carried by lens cover 62. The lever 61 which is L-shaped, has a bifurcated end which engages the focusing arm and is pivoted about a bushing 63 connected to lens cover 62. The other end of lever 61 extends through an aperture in the lens cover 62 at a position to be actuated by an operator whereby the focus of the lens can be adjusted.

Figure 2:
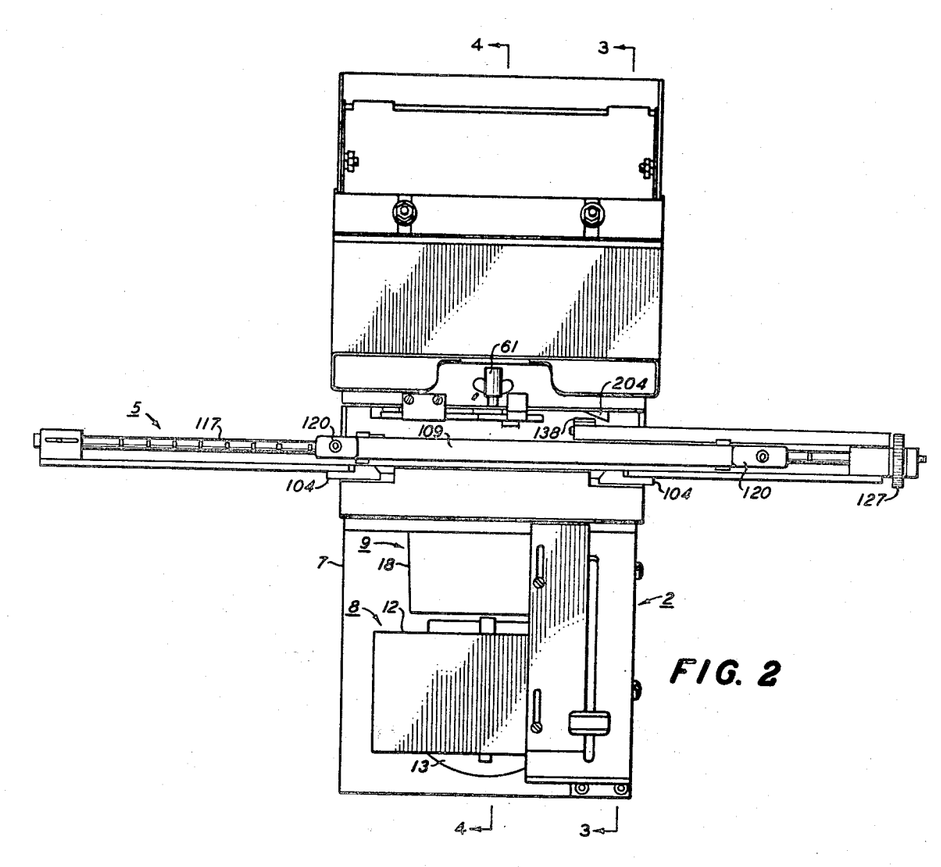
FIG. 2 is a top view of the projector of FIG. 1, with the exterior covers removed.
Figure 3:
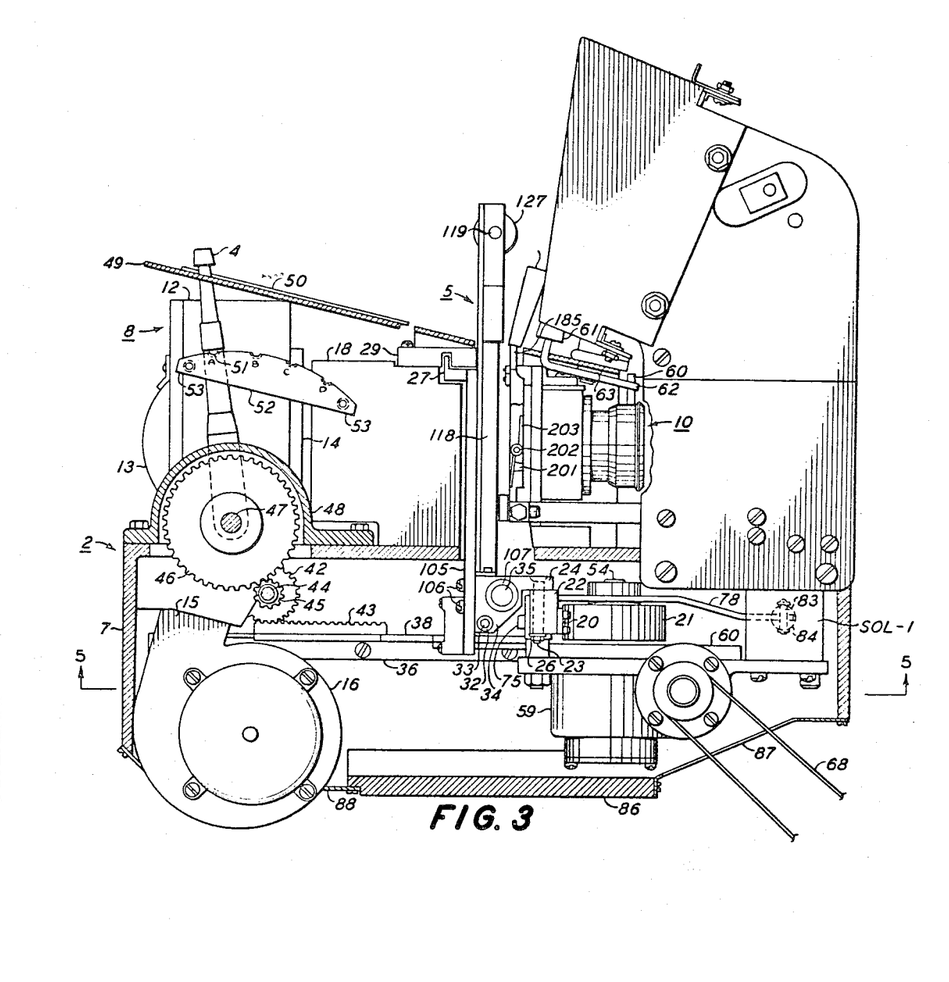
FIG. 3 is a sectional view of the projector taken along line 3—3 of FIG. 2.
Figure 4:
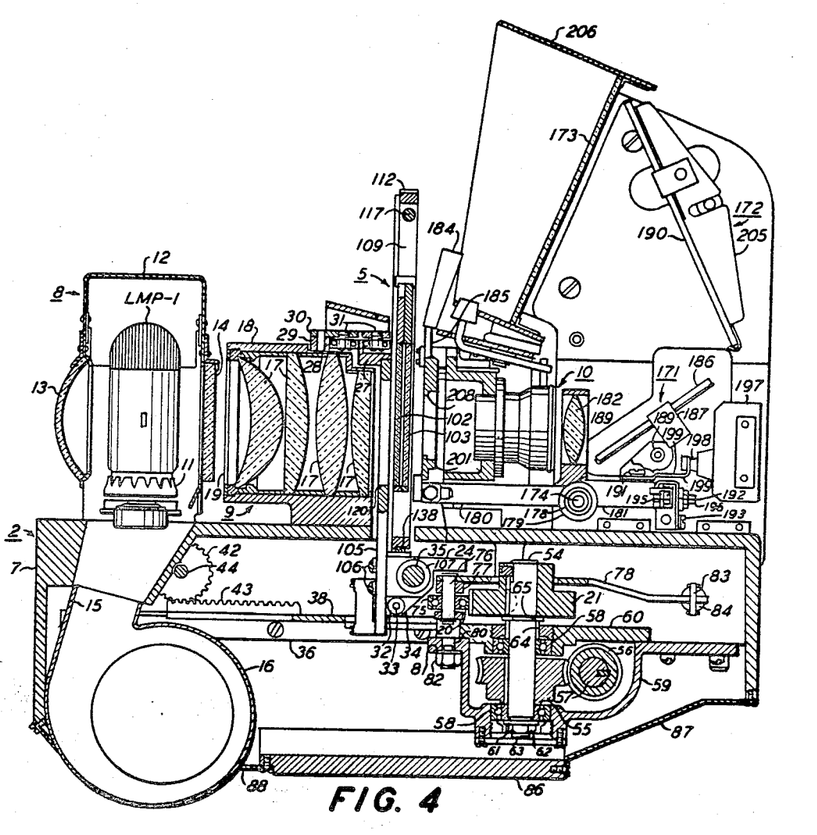
FIG. 4 is a sectional view of the projector taken along line 4—4 of FIG. 2.

In FIGS. 1 through 6, the carriage and microfiche holder are shown assembled in the projector and in FIGS. 7 through 10, microfiche holder is shown in detailed form. The carriage assembly 5 includes an indexable holder plate 109 which includes a microfiche holder clamping assembly comprising a back plate 102 and a front plate 103. Attached to main frame 118 are dovetail members 104 which mate with vertical dovetail guides on an apertured carriage plate 105. As seen in FIGS. 3 and 4, the carriage plate 105 is movably supported by a bearing block 24 by means of screws 106. The bearing block rides on the carriage shaft 35 secured in the side walls of the projector casing, the bearing block being suitably journaled on the shaft by means of bushing 107. The upper end of the carriage plate is guided in a path perpendicular to the axis of the condenser lens by means of a carriage guide 27 secured to the back side of the carriage plate riding between bearings 28.

The front plate 103 is pivotally secured to the back plate 102 by a pair of pivot pins 110 and a pair of leaf springs 111. The pivot pins 110 are journaled in the front plate 103 of the microfiche holder. Front plate 103 is held in position by springs 111 and pivots about 110. A rectangular aperture 116 in the front plate 103 is aligned with the condenser lens 117, a circular aperture 113 in the main frame 118 and the projector lens 10.

The movable indexable holder plate 109 is positionable along an index rod 117 which is mounted in the main frame 118. The indexing rod 117 contains a series of indentations 120. The indexable holder plate 109 has two areas 112 thereon each containing a circular hole 121 containing a spring 122 and a ball bearing 123 for positioning the index plate 109 along the index rod 117. The indexing rod 117 is adjustable relative to the main frame 118. The indexing rod 117 is movable within the end block 124 and maintains the indentations 120 in the horizontal position by means of a pin 125 rigidly secured thereto which fits within the blocks 124. The pin 125 is slidable within the slot 126 of the blocks 124. At the other end of the main frame 118, a vernier adjustment is used to move the threaded end 119 of the indexing rod 117 relative to the main frame 118 by moving knob 127. Thus, the indexing plate may be moved relative to the lens system of the projector without indexing the indexable holder plate 109. Thus a fine adjustment in the horizontal position is provided to adjust the microfiche in the microfiche holder 101.

The holder 101 is also adjustable and indexable in the vertical direction. The rear plate 102 has mounted therein a vertical indexing plate 128 which has a series of indentations 129 therein. The indexable holder plate 109 contains a slot 150 which allows arm 136 to be adjusted vertically. Arm 136 contains a circular opening 130 containing a spring 131 and ball bearing 132. The spring 131 forces the ball 132 against the indentations 129 in the plate 128. The entire microfiche holder 101 is adjustable in the vertical direction by means of a vernier adjustment which moves screw 134 against the rod 135 which is secured to the carriage 109 through the connecting arm 136 which is directly secured to the back plate 102.

The back plate 102 is slidable along the groove 139 relative to the indexable holder plate 109 by means of a ball bearing 140 which is held in the groove 139 by means of a screw 141.

The microfiche is inserted between the front plate 103 and the back plate 102 by moving the front plate 103 against the force of the leaf springs 111 and separating this plate from the rear plate 102. An indentation 143 is provided in the front plate 103 for easy gripping and moving of the front plate. The microfiche can then easily be slid between the front plate 103 and the rear plate 102 within the microfiche holder 101.

To provide the proper selection and positioning of the image to be reproduced, a viewing and positioning screen generally indicated at 170 in FIG. 1 has been provided immediately above the projector 2. When the image is to be reproduced, the microfiche is placed in the microfiche holder by moving the front plate 103 away from the operator as viewed in FIG. 1 and slipping the microfiche between the plates 102 and 103. In the embodiment shown, a 4 inch by 6 inch microfiche may be accommodated containing up to 72 images. The indexable holder plate 109 is then positioned either to the extreme right or extreme left of the carriage 105 on the indexing rod 117. In a similar manner the plates 102 and 103 are positioned to the extreme top or extreme bottom of the indexable holder plate 109 along the plate 128.

After the microfiiche has been inserted in the holder it may be viewed as indicated below. In viewing the microfiche, it can be centered on the screen 173. The fiche may be positioned both horizontally and vertically by means of the vernier adjustments by moving the knobs 127 and 133. It is possible to copy either one, two, or six images at one scan of the projector. After the microfiche has once been viewed on the screen and positioned by the vernier adjustment it is then possible to scan the number of images desired, for example 6. The indexable holder plate 109 can then be moved on the indexing rod 117, 3 indentations in the horizontal direction, a total of four times thereby scanning either images on the top or bottom row. The plates 102 and 103 can be indexed in a vertical direction 2 indentations on the plate 128, a total of 2 times thus copying two-thirds of microfiche or 72 images after only one setting of the vernier adjustment. The remaining one-third or 24 images can then be reproduced by removing the fiche and reinstating the fiche in the holding after rotating the fiche 180° without turning the fiche over the fiche. The sequence of indexing manipulation can be any manner desired by the operator, that is, from left to right, right to left, top to bottom or bottom to top. In the instant embodiment the indentations 120 on the indexing rod 117 and the indentations 129 on the plate 128 have been set so that each indentation indexes the microfiche holder one image in the direction in which the indexable holder plate 109 or holder assembly 101 is moved. When an image is to be reproduced, the microfiche is placed in the microfiche holder. The image is viewed in the viewing assembly 170 and minor adjustments for centering purposes are made by the operator by moving the vernier adjustments. The microfiche holder assembly 101 is closed, clamping the microfiche holder in position.

Details of the operation and apparatus of the viewing assembly 170 are seen more clearly in FIGS. 4 and 6. When a light image of the copy being reproduced passes through the projector lens assembly 10, it normally continues on into the body of the machine to a larger mirror assembly, not shown herein, but completely illustrated and described in the previously mentioned Patent No. 3,078,770. However, to view the image on the viewing screen, a slidably mounted mirror assembly, generally indicated as 171 in FIG. 4, is positioned in front of the projector lens assembly. A light image of the microfilm is then reflected from the mirror assembly 171 upward onto a large mirror assembly 172 and is again reflected onto the surface of a ground glass viewing platen 173.

The mirror assembly 171 is slidably mounted on a shaft 174, supported in side walls 175 of the viewing assembly 170. The walls 175 are attached to the projector casing 7 by means of screws 176 and encloses the mirror assembly 171, the large mirror assembly 172 and the ground glass viewing platen 173. Mounted on the shaft 174 is a viewer carriage 178 slidably mounted by means of bearing 179. The viewer carriage 178 consists of an adjustment arm 180 and a mirror assembly arm 181. Also mounted on the viewer carriage 178 directly in front of the mirror 171 is a lens 182. The lens 182 is held in a lens retaining block 183 formed as an integral part of the viewer carriage 178.

A positioning knob 184 is attached to the adjustment arm 180 by means of positioning lever 185 and movable plate 201. The positioning arm 184, the positioning lever 185 and the movable plate 201 are located directly behind the card holder assembly 101 and movement of the knob in a direction perpendicular to the light path through the projector produces a corresponding movement of the viewer carriage 178 along shaft 174. Thus, the lens 182 and the mirror assembly 171 may be moved into or out of the light path of the projector lens assembly 10.

The mirror assembly 171 consists of a small mirror 186 secured in a mirror frame 187 which is pivotally attached to bracket 188 by means of bolts 189. The mirror 186 and the frame 187 may be rotated about bolts 189 for proper adjustment of the reflected image onto a large mirror 190. The bracket 188 is secured to the mirror assembly arm 181 of the viewer carriage 178 by means of screws 191 and the entire mirror assembly 171 moves with the viewer carriage 178, in a path parallel to the longitudinal axis of the shaft 174. To the rear of the mirror assembly arm 181, there is a guide rail 192 secured to the frame 7 by means of screws 193. A guide roller 194, rotatively secured to the mirror assembly arm 188, rides in the guide rail 192 to ensure proper alignment and movement of the mirror assembly 171. A small detent block 195 is secured to the back of the mirror assembly arm 181 and extends into the guide rail 192. A set screw 196, mounted on the guide rail 192, contacts detent block 195 when the mirror assembly 171 is in a non-viewing position and thus secures the mirror assembly in that position preventing movement and possible interference with the light path of the image being reproduced.

An electrical switch 197 is mounted on the side wall 175 and has a contact 198 to control operation of the projection lamp LMP–1 during the viewing operation. A small contact arm 199 extending out of the bracket 188 actuates the switch contact 198 turning the lamp LMP–1 off when the mirror assembly 171 has been moved to a non-viewing position, and releases the contact 198 turning the lamp LMP–1 on when the mirror assembly 171 is moved into a viewing position.

To view an image on the viewing screen 173, the positioning knob 184 is moved to the extreme right as viewed by an operator looking into the viewing platen 173. The positioning lever 185, as seen in FIG. 4, is attached to a movable plate 201 by means of pin 202 and held against plate 201 by torsion spring 203. The plate 201 is secured to the adjustment arm 180 and produces movement of the adjustment arm 180 when a positioning knob 184 is moved in either direction.

Figure 5:
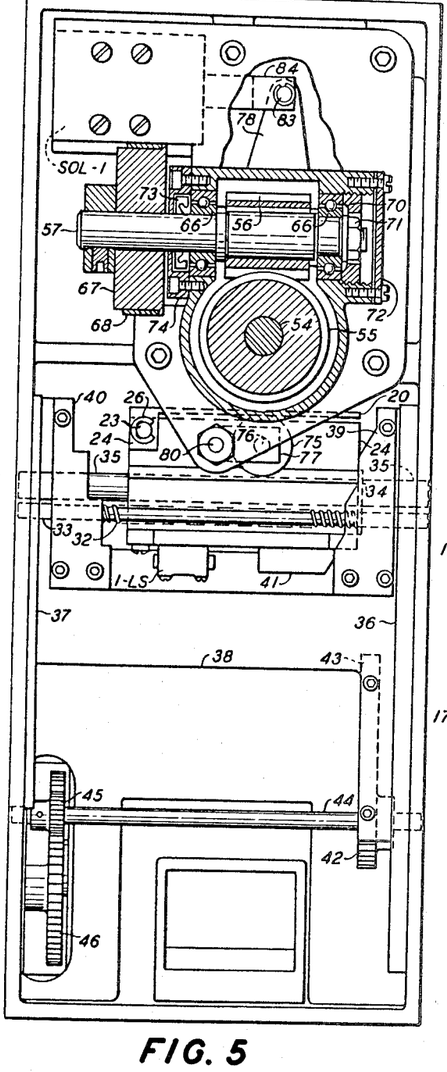
FIG. 5 is a sectional view of the projector taken along line 5—5 of FIG. 3.

To view an image on the viewing platen 173, the adjustment knob 184 is moved to the right and pulled toward the operator against the action of spring 203. When the knob 184 is released, it is caught on the positioning knob stop 204, as seen in FIG. 2. The movable plate 201 is then out of the optical path of the projector and the viewer carriage 178 is moved along shaft 174 to a point where lens 182 is directly in front of the projector lens assembly 10. The mirror assembly 171 is also in front of the projector lens assembly 10, and the contact arm 199 has released contact 198 of switch 197 illuminating lamp LMP–1. Light from lamp LMP–1 passes through the condenser lens assembly 9, the apertures in the carriage plate 105, and the film holder 101, passing through the microfilm mounted in film holder 101 and through the projector lens 10, the lens 182 onto the mirror 186. The light image from the microfiche is reflected from mirror 186 upward to the large mirror 190 mounted on mirror frame 205. The mirror frame 205 is adjustably connected to the side walls 175 of the mirror housing, and is adjustable to reflect the image from mirror 190 onto the surface of the ground glass viewing platen 173. A viewing screen shield 206 is provided around the viewing glass 173 to shield the viewing surface from the stray light. When the positioning knob 184 is moved to the right for viewing purposes, a cam 138 mounted on the front of the frame 118 of the microfiche holder is contacted by the movable plate 201 and the entire carriage assembly 5 is also moved to the right against the action of spring 32, as seen in FIG. 5. This movement assures proper alignment of all the apertures in the carriage assembly 5 for purposes of viewing. However, when the positioning knob 184 is released from the positioning stop 204, spring 32 moves the entire carriage assembly back to the start-of-scan position and it carries with it the movable plate 201 and the entire viewer carriage 178. The knob 184 is then moved a short distance to the left, so that a scanning slot 208, in movable plate 201, is in position to scan the image on the microfiche as the carriage 5 and the film are moved through a scanning cycle. If desired, the movable plate 201 may be spring loaded to return to a start-of-scan position after it is released from positioning stop 204. The slot 208 is a vertical slot, which remains in a stationary position while the carriage assembly 5 is carrying the microfiche across the light path from lamp LMP–1 through the condenser lens assembly 9.

While the present invention, as to its objects and advantages as described herein, has been carried out in a specific embodiment thereof, it is not desired to be limited thereby, but it is intended to cover the invention broadly within the spirit and scope of the appended claims.

What is claimed is:

1. In a projector of the type wherein a microfiche containing a plurality of microimages is scanned, apparatus to position selected image or images in a light path of the projector and to move the selected image or images across the light path for scanning thereby including
- a movable carriage mounted on the projector transversely to the light path,
- an indexable holder mounted on the carriage,
- a microfiche clamping means mounted on the indexable holder,
- means for indexing the microfiche holder relative to the carriage so that the selected image or images on the microfiche are positioned horizontally relative to the carriage,
- means for indexing the microfiche clamping means relative to the indexable holder to position the microfiche in the vertical direction so that the selected image or images in the microfiche are positioned vertically to the carriage, and
- means to drive the carriage, the indexable holder and the microfiche clamping means transversely to the light path to scan the image or images on the microfiche.

2. A device as recited in claim 1 including means for adjustably positioning the indexable holder relative to the carriage.

3. A device as recited in claim 2 including means for adjustably positioning the microfiche clamping means relative to the indexable holder.

References Cited

UNITED STATES PATENTS 3,260,153  7/1966  Abbott et al. _______ 95—4.5 X

NORTON ANSHER, *Primary Examiner.*

R. A. WINTERCORN, *Assistant Examiner.*